UNITED STATES PATENT OFFICE.

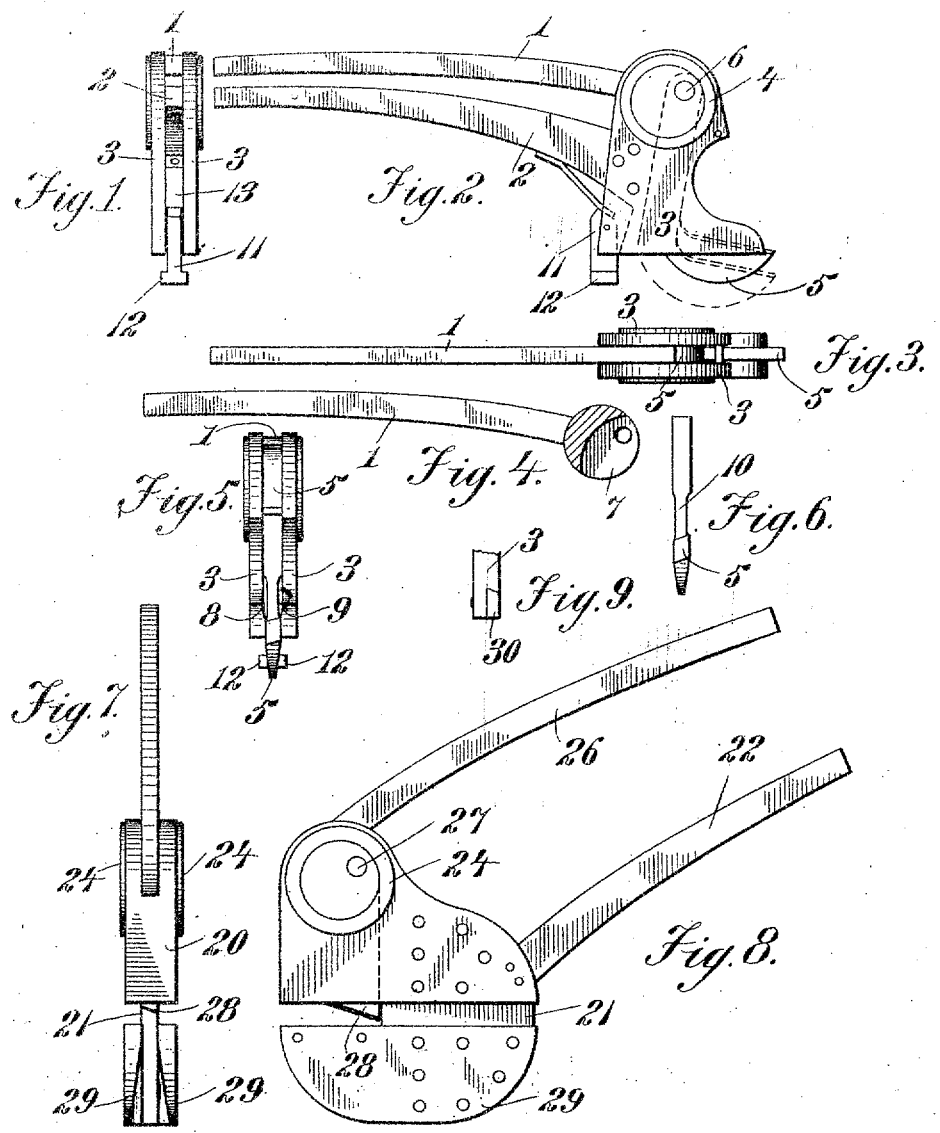

GEORGE POTSTADA, OF SAN FRANCISCO, CALIFORNIA.

METAL-SHEARS.

No. 879,900.      Specification of Letters Patent.      Patented Feb. 25, 1908.

Application filed October 22, 1907. Serial No. 398,673.

*To all whom it may concern:*

Be it known that I, GEORGE POTSTADA, a subject of the Emperor of Germany, residing at San Francisco, in the county of San Francisco and State of California, have invented a new and useful Metal-Shears, of which the following is a specification in such full and clear terms as will enable those skilled in the art to construct and use the same.

This invention relates to shears used for the purpose of cutting sheet metal of any desired thickness up to about three eighths of an inch, the principal object of the invention being to make the cutting of the metal much easier than with the plain shears commonly called "plumbers' snips".

Another object of the invention is to make a pair of shears that will cut the sheet metal without having the same curl up beside the hand of the person using the shears, and to make it easy to cut a hole out of the center of a sheet of material which would be impossible to cut with the "snips".

A further object of the invention is to provide means to release the cutting knife from the metal cut in order that it and the shears may be moved ahead with little trouble for another cut.

A further object of the invention is to provide means to guide the knife straight ahead and at the same time to use such means to guide the knife as may be moved out of the way when it is desired to cut around a short circle.

A further object of the invention is to provide means whereby the metal cut out will be led from the cutter in such a way as not to interfere with the proper working of the shears.

In the drawings, in which the same numerals are applied to the same parts throughout, Figure 1 is an end elevation of the shears looking at the handle end; Fig. 2 is a side elevation of the shears, the handles being cut short; Fig. 3 is a plan of the shears, Fig. 4 is a side elevation of the handle alone, the handle head being shown in section, Fig. 5 is a front elevation of the shears, Fig. 6 is a front edge view of the knife, Fig. 7 is a front view of a modified form of the shears, Fig. 8 is a side elevation of the modification, and Fig. 9 is a front view of a removable knife that may be used, if desired, with either form of the shears.

The shears are made from any suitable material, as sheet steel, steel plate, or cast steel. The handles are made of any material that is stiff enough to give the necessary strength, the handle 1 carrying a head 7 and the handle 2 being secured to the plates 3 of the shears. The head of the shears is made of two plates 3, 3 which are riveted to the handle 2 by any desired number of rivets, it being understood that to resist the strains put on it that the riveting must be very strong. The plates 3 have eyes 4 near the top thereof and another rivet is placed in the plates in front of the knife to keep the plates from being pushed apart when a sheet of metal is being cut by the knife 5. The knife 5 is L shaped, as indicated by the dotted lines in Fig. 1, and it is carried by the pin 6 which passes eccentrically through the head 7 of the handle 1. Now it will be observed that any motion of the head 7 will cause the knife to move up or down, as the case may be, and that it will cut from a sheet of metal a strip of the same width as the space between the plates 3, but since this strip is not very wide it is not much of a loss. It will be noted that the knife has its cutting edge inclined from the right downwardly, see Figs. 5 and 6. The object of having the knife inclined in this way is to cause the strip cut out to curl up in a spiral at one side of the shears, since if the knife is square across the strip will curl up straight in front of the knife and make it very difficult to finish the cut.

It will be observed that the plates 3 are wider apart a short distance above the lower edge than at said edge, the object of this being to release the cut out strip easily and not become clogged with the metal cut out. It will be noted that the knife has a narrow shank just above the cutting edge at 10, and that it tapers below said edge, the purpose of each of these narrow parts is to make it easier to move the knife in the cut. The knife is pulled up through a sheet of metal to the position indicated by the full lines in Fig. 1 when the entire cut has been made, now if the knife is the same size to its lower end it will be very difficult to push back to such a position as will enable another cut to be made, and the narrow edge greatly facilitates the entering of the knife for the return movement. Then if the knife were the same thickness above the cutting edge it would be very hard to shove it along for another cut so it has the narrow shank 10 to enable it to be pushed ahead easily, when opened for a second cut. When the knife has been pushed through the metal on one cut the two sheets of metal spring back very strongly and if no means is provided to push the knife through the metal it is very liable to move the shears up instead of moving back through the metal for another cut, so to make sure that the knife is pushed back for another cut the guide plate 11 is provided with two lugs 12 which extend across the cut and keep the sheet of metal up close to the bottom of the plates 3 when the knife is being pushed down by the movement of the eccentrically placed pivot in the handle head 7. This part 11 also acts to guide the cut straight ahead, but since it is often necessary to cut a short curve it is pivoted in the plates 3, a spring 13 secured to the handle 2 serving to hold the guide in either the operative or the inoperative position.

Modifications of the invention may be made without departing from the spirit thereof and one such modification is shown in Figs. 7 and 8. In this form of the invention the knife moves down on the cutting stroke instead of up as in the other figures, and it is carried by plate 20 which is bent around into a U shape, said plate 20 being riveted to the bar 21 and to the handle 22. Near the top of the plate are the eyes 24, 24 in which is carried the head 25 of the handle 26. This head 25 is provided with an eccentric pivot pin the same as that shown for the other form of the invention, and pivoted on this pin 27 is the knife 28. The parts for the knife to operate against are the plates 29 which are riveted to the bar 21. It will be observed that the plate 24 acts as the lugs 12 do in the other form of the invention since this knife is pulling out of the cut on the upward stroke. It will be observed that the plates 3, 3 in the first form of the invention are widened at 8 and 9 and the plates 29 in the modification are widened in the same way in order to allow the strip of cut metal to be taken out of the slot easily. The knife in each case is a little thicker at the upper part than at the cutting edge in order to increase the bearing surface at that point, note Fig. 6.

If the head is made from a casting it will be necessary to provide means to make the edge of the casting stand up under the strains due to cutting and this is done by letting into the plate 3', see Fig. 9, the steel plate 30 which is held in place by means of a pair of screws or rivets.

Having thus described my invention what I claim as new and wish so secure by Letters Patent of the United States is as follows:

1. In a metal shears, the combination with a pair of handles, of a knife carried by one of the handles, a head carried by the other handle and through which the knife is slidable, and a spring held guide for keeping the cut straight.

2. In a metal shears, the combination of a pair of handles, a knife carried by one of the handles and adapted to move at right angles with the cutting edge, a head carried by the other handle and through which the knife is adapted to slide said head having a cutting edge on each side of said knife, and means to guide the shears across the metal sheet, as the cut is made.

3. In a metal shears, the combination with a pair of handles, of a knife carried by one of the handles said knife having an elongated shank passing through a head carried by said handle, a head carried by the other handle and through which the knife is adapted to slide, and a guide in the rear of the knife to keep the cut straight.

4. In a metal shears, the combination of a head having a handle secured thereto said head comprised of a pair of plates having circular eyes near the top thereof, a head fitted to said eyes and having a handle secured thereto, a pin in said head and eccentrically placed with respect to the head, a knife carried by the head and having a cutting edge at substantially a right angle with the shank, and means in the rear of the knife to guide the shears as the cut in the metal is made.

5. In a metal shears, the combination of a head having a handle secured thereto said head having a pair of circular eyes near the top thereof, a second handle having a head to fit said eyes and having a pin placed eccentrically with reference to said eyes and head, a knife carried by the pin and having its cutting edge extending at right angles with its supporting shank the shank of said knife just above the cutting edge being thinner than the cutting edge, a guide carried by the shear head and having lugs on each side thereof whereby the sheet is held close to the shears when the knife is pushed against the sheet on the inoperative stroke.

6. In a metal shears, the combination of a head carried by a handle and having a pair of eyes near the top thereof, a second head fitting said eyes and having a handle, a pin placed eccentrically of said second head, a knife carried by said pin and having its cutting edge at substantially a right angle with its shank said cutting edge also being at an angle other than 90 degrees with the line of motion of said knife, and a hinged guide carried by the shear head.

7. In a metal shears, the combination of a head carried by a handle said head having a pair of eyes near the top thereof, a second handled head fitting said eyes and having a pin placed eccentrically of said head, a knife carried by said second head, a pivoted guide carried by the first head and placed in the rear of the knife, and a spring adapted to hold the guide in the operative or the inoperative position.

8. In a metal shears, the combination of a handle carrying a head having a pair of eyes near the top thereof, a second handle carrying a head fitting said eyes and having a pin placed eccentrically of the head, a knife carried by the head in the eyes said knife being thinner above the cutting edge than at said edge said cutting edge also being inclined at an acute angle to the line of motion of said knife, a pivoted guide carried by the shear head and in the rear of the knife, and a spring bearing on the guide and adapted to hold it in the operative or the inoperative position at the will of the user.

In testimony whereof I have set my hand in the presence of the two subscribed witnesses.

GEORGE POTSTADA.

Witnesses:
W. T. HESS,
C. P. GRIFFIN.